United States Patent Office 2,967,948
Patented Jan. 10, 1961

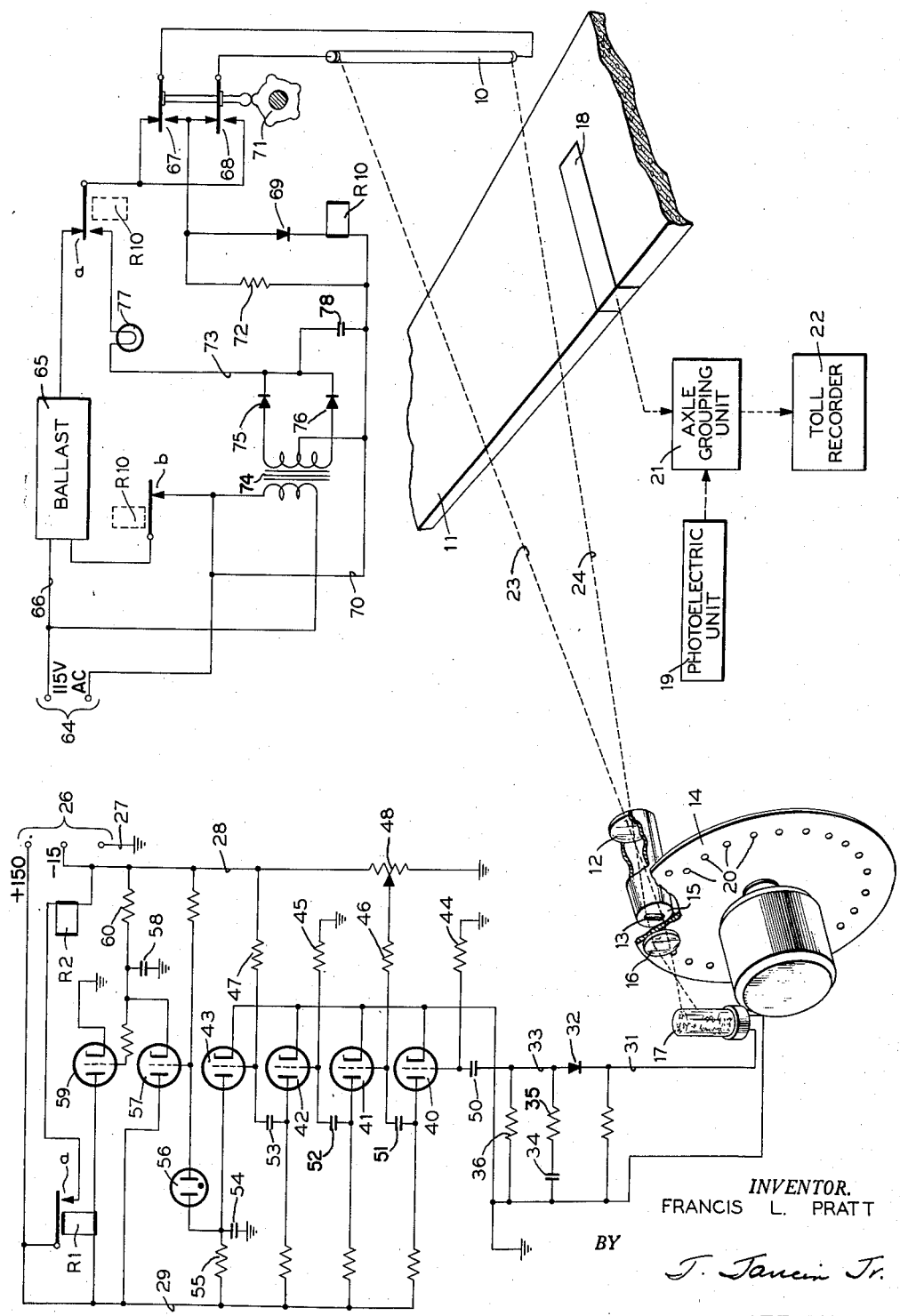

2,967,948

OBJECT DETECTING AND INDICATING DEVICE

Francis L. Pratt, Endwell, N.Y., assignor to International Business Machines Corporation, New York, N.Y., a corporation of New York Filed Sept. 20, 1955, Ser. No. 535,494

8 Claims. (Cl. 250—222)

This invention relates in general to a photoelectric device for detecting and indicating objects, and in particular to a photogating device for use in a vehicle classifying and data processing system.

A photogating device for use in a system of the aforementioned type is shown and described in copending U.S. Patent application, Serial No. 443,264, entitled Toll Highway Recorder System, which was filed on July 14, 1954, by J. M. Cunningham et al. As is shown and described in this copending patent application, the photogating device thereof is a part of a dynamic weighing toll highway recorder system and includes a plurality of toll road bridging light beams having associated photoelectric tubes so arranged that a region substantially in one plane above the roadway, is traversed by the plurality of light beams. Such a photogating arrangement is very satisfactory for detecting and indicating a comparatively large object, such as a vehicle for example. It is possible, however, for objects smaller than an ordinary vehicle to by-pass all of the roadway traversing light beams, to thereby cause a failure in the detection of said smaller objects. It is common practice, for example, for one vehicle to pull a trailer by means of a draw-bar, or the like, which usually has a cross-sectional dimension of approximately two inches. Furthermore, it is possible for the draw-bar to be moved among all of the aforesaid roadway traversing light beams of the photogating device of the type disclosed in the afore-mentioned copending patent application. For this reason, i.e., for the reason that the physical connection between the vehicle and the trailer would not be detected, the data relating to the vehicle pulling the said trailer would first be processed by the toll recorder system as that for a single vehicle, after which the trailer data would be processed as that for a second vehicle. This, of course, would produce an undesirable result, and is one that cannot occur with the present invention. That is, according to the preferred embodiment of the present invention, the present photogating device will so condition the toll recorder system associated therewith that data relating to the vehicle and the trailer being pulled thereby, are processed as data for a single multiple axle vehicle so long as said trailer is physically connected to said vehicle by the draw-bar.

The broad object of this invention is to provide an improved movable and stationary object detecting and indicating device.

Another object of this invention is to provide a photoelectric apparatus for detecting an object of predetermined minimum size anywhere in a designated region.

In line with the foregoing, another object of this invention is to provide a toll highway recorder system photogating device for detecting an object of predetermined minimum size anywhere in a designated region in a single plane substantially normal to a roadway.

As the description advances, it will be brought out in detail that a photoscanning device including an electronic missing pulse detecting circuit is used to scan an elongated source of constant intensity light, and to detect an abrupt change in the intensity of the light any time during the sweep thereof. It will also be explained as the description advances that the said elongated source of light in the preferred embodiment of this invention may actually be a 72-inch "warm white" fluorescent lamp wh.ch is placed on one side of a roadway for vehicular traffic, whereas the photoelectric scanning apparatus is placed on the opposite side of the roadway. As indicated hereinabove, it is necessary to have a source of light of unvarying intensity. This may be obtained of course, by operating the afore-mentioned fluorescent lamp on d.rect current (D.C). However, as is well known to persons familiar with the operation of fluorescent lamps, a considerably higher voltage is required to start a fluorescent lamp than is needed to operate the same, so that quite a serious power supply problem arise when D.C. operation of a fluorescent lamp is contemplated. This general problem is overcome in the preferred embodiment of this invention by starting the afore-mentioned fluorescent lamp on alternating current (A.C.) and then running the same on D.C.

As may be expected, it is most practical and preferable to place a covering of sorts over the subject photoscanning device in order to keep out objectionable natural elements such as snow, rain, etc. There are other natural conditions such as fog and haze, for example, which are not so easily avoided. The presence of a haze over the roadway would, of course, have a tendency to lower the light intensity of the entire elongated source so far as the photoelectric scanning device was concerned. Since the likelihood of a haze, or the like, over the roadway is always good, the subject photoscanning device to be effective under all conditions must be capable of ignoring the change, usually a decrease, in the magnitude of the light intensity being picked up by the photoscanning apparatus. On the other hand, the subject photoscann.ng device should be capable of detecting a sudden change in the magnitude of light intensity even though the latter change in magnitude need not necessarily exceed the magnitude of the decrease caused by the haze. This is brought about in the present invention by, in effect, comparing the intensity of the light during one minimum area portion of the sweep with the average intensity thereof during the preceding portions of the sweep. Thus, since a weather condition such as haze will maintain the light intensity of the entire elongated source at a fairly constant level so far as the photoelectric scanning apparatus is concerned, the afore-mentioned comparison operation will produce no sudden change by which an object is indicated. An object over the roadway would, however, cause a sudden change in the light intensity during the sweep.

Accordingly, another object of this invention is to provide a phtoscanning apparatus for ignoring a gradual light intensity change but for detecting a sudden light intensity change.

Another object of this invention is to provide an improved photoscanning apparatus and for detecting a change in light intensity during the sweep of an elongated source of light.

Other objects of the invention will be pointed out in the following description and claims and illustrated in the accompanying drawings, which disclose, by way of examples, the principle of the invention and the best mode, which has been contemplated, of applying that principle.

The drawing is a somewhat diagrammatic view of the mechanical and electrical aspects of the present invention.

*Use of photogating device in a toll recorder system—general description*

A toll highway station whereat apparatus for processing a vehicle associated trip card is located, may include an axial treadle 18 (see drawing) which is embedded in a roadway 11. The number of vehicle axles passing over the axle counting treadle 18 in a forward direction, are registered in toll recorder 22 as forward axles, whereas the number of axles passing over treadle 18 in a reverse direction, are registered as reverse axles in the said toll recorder.

A photoelectric gating system is required to detect the presence of a vehicle passing through the toll highway station via roadway 11. This afore-mentioned system which includes photoelectric unit 19 is effective in combination with the circuits (not shown) of axle treadle 18, to govern an axle grouping unit 21 for grouping the axles-per-vehicle of each vehicle passing over the treadle in the roadway. This axles-per-vehicle grouping information is supplied to toll recorder 22 as is shown in the drawing, for the processing of a trip card.

To amplify the very important function of axle grouping unit 21, let it be assumed that a 2-axle vehicle first passes over treadle 18, which said vehicle is then followed by a 3-axle truck, and after which the said truck is followed by another 2-axle passenger vehicle. Thus, all in all, there have been seven axles moved over treadle 18 by three different vehicles. The function of the photogating apparatus including photoelectric unit 19, is to detect the separated vehicles as they pass over treadle 18 and to so condition the axle grouping unit 21 that the seven axles stored therein are arranged in a two-three-two axle order in order to correspond to the 2-axle, 3-axle, and 2-axle vehicles passing over treadle 18.

As mentioned previously, the photogating arrangement disclosed in the copending Cunningham et al. patent application does not, and in fact cannot, detect objects which are of such a small size as to pass between any of the plurality of roadway traversing light beams, to thereby fail to interrupt any of these light beams. Thus, should a 2-axle passenger vehicle be pulling a 1-axle trailer by means of a two-inch draw-bar, and should the said draw-bar fail to interrupt any of the plurality of traversing light beams in the photogating device disclosed in said copending application, the axle grouping unit 21 which is governed by treadle 18 and photoelectric unit 19 will store the axles in a two-one order. As stated previously, it is desirable in such a situation, to group all three axles, i.e., the two axles of the passenger vehicle and the single trailer axle, as three common axles carried by single vehicle. The reason for this should be obvious inasmuch as there is only a single vehicle operator for both the passenger vehicle and the trailer. The photoscanning apparatus for performing the latter operation and, in addition, all operations performed by the photogating device described in said copending application, will now be described in detail.

*Photogating scanning device*

Referring to the drawing once again, the preferred embodiment of this invention includes a 72-inch "warm white" fluorescent lamp 10 such as a type T-12 lamp, for example, which is placed perpendicular to the roadway 11 on the far side of the roadway. The said lamp is situated relative axle treadle 18 so that a vehicle is detected by the photogating apparatus prior to the first axle thereof passing over the said treadle. A lens 12 on the near side of the roadway forms an image of the column of light being emitted from fluorescent lamp 10, via a slit-like aperture 13 in a masking member 15. Member 15 may actually be on either side of a scanning disc 14, although it is preferable to have it located as shown in the drawing. The focal plane of the image of the column of light is in the same plane within which disc 14 is located and rotated. The distance between lens 12 and member 15 may be two inches, for example, and the distance between the 72-inch fluorescent lamp 10 and lens 12 may be ten to seventeen feet, for instance. Immediately adjacent the aperture 13, there is located the continuously rotating opaque scanning disc 14 which may be 6½ inches in diameter, for example, and which contains a series of equally spaced transparent scanning holes 20 each of which may be 0.015 inch in diameter, for example. The holes 20 may be approximately 4° apart and radially displaced 0.0065 inch, and are so arranged on disc 14 in a spiral-like manner that during one revolution of the scanning disc 14, the light image is completely scanned thereby. Of course, each time a transparent hole 20 is moved into alignment with the light image, light rays are projected onto a collector lens 16 so long as there is no obstruction between lamp 10 and lens 12. The light directed to lens 16 is then applied to photoelectric tube 17, preferably a type 931A photomultiplier tube. Hence, it should be clear at this time that a series of light pulses corresponding to the timing alignment of holes 20 in disc 14 with aperture 13, will be caused to impinge upon photoelectric tube 17 as the scanning disc is rotated. Of course, should any opaque object, i.e., an obstruction such as a vehicle or a draw-bar, be placed between lamp 10 and lens 12 anywhere in the region over roadway 11 which region is defined by the light ray lines 23 and 24, a corresponding dark area will appear in the image of the column of light in aperture 13. This object over the roadway may be as large as a vehicle, for example, so that a portion of the image in aperture 13 corresponding to a plurality of holes 20 may be dark, or as small as a draw-bar for connecting a vehicle and a trailer so that a portion of the image corresponding to only one scanning hole may be dark. The design of the preferred embodiment of this invention is such that a draw-bar of two-inch minimum size may be detected and indicated. However, should it be desired to detect an object smaller than two inches, it would be necessary to only re-design the optical portion of the present invention so that depending upon the size of the object between lens 12 and lamp 10, the train of light pulses directed onto photoelectric tube 17 will be interrupted as one or more holes 20 are brought into alignment with the dark area of the image in aperture 13.

The photoelectric tube and the pulse detecting circuit to be described in detail shortly, are connected to a suitable source of voltage supply 26, such as 0, −15 and +150 volts, for example, on lines 27, 28 and 29, respectively. Condenser 34 which may have a value of 0.05 microfarad, for example, is connected, at one end, to resistor 35 which may be 100K ohms and, at the other end, to ground potential. Resistor 36 which may be 1 megohm is connected, on the other hand, between the other end of resistor 35 and ground potential. Hence, condenser 34 normally tends to discharge through resistors 35 and 36. The constant intensity light pulses picked up by photoelectric tube 17 are converted to negative-going electrical pulses along line 31 at the output of the said photoelectric tube. The potential at line 31 being more negative than that on the other side of diode 32, i.e., along line 33, because of the discharging of condenser 34 via resistors 35 and 36, condenser 34 is charged in response to the incoming negative-going signal from photoelectric tube 17 when diode 32 conducts via resistor 35. Hence, each incoming negative pulse from photoelectric tube 17 causes a small but abrupt negative surge at the junction between resistors 35 and 36 while condenser 34 is being charged. It might be brought out here that condenser 34 normally tends to discharge through resistors 35 and 36, but never seems to discharge entirely due to insufficient discharge time so that during this period of time the afore-mentioned common junction point between the said resistors is at a potential slightly more positive than that of condenser 34.

The aforesaid small but abrupt negative surge at the junction between resistors 35 and 36 along line 33, is clipped, shaped and inverted by vacuum tubes 40–42, so as to form a positive-going flat-topped wave on the grid of tube 43. The vacuum tubes 40 and 41 are preferably duo-triodes in a type 12AX7 tube, whereas the vacuum tubes 42 and 43 are preferably duo-triodes in a type 12AT7 tube. As is shown in the drawing, the grides of tubes 40 and 42 are connected to ground potential via one megohm resistors 44 and 45, and the grids of tubes 41 and 43 are connected to their respective biasing points via one megohm resistors 46 and 47. A potentiometer 48 is used in the grid circuit of tube 41 so that the same stands just at cutoff. The condenser 50 has a value of 0.1 microfarad, whereas the condensers 51–53 each have a value of 0.01 microfarad.

The 0.005 microfarad condenser 54 uhich is connected to the plate of tube 43, normally attempts to charge up through 250,000 ohm resistor 55 to the value of the voltage along line 29. However, each time tube 43 is caused to conduct as a result of the positive-going pulse that corresponds to a light pulse impinging photoelectric tube 17, condenser 54 is discharged through vacuum tube 43. In other words, the train of positive-going pulses applied to tube 43 from tube 42 cause condenser 54 to periodically discharge when tube 43 conducts. As a result, the voltage across gas diode 56 is prevented from reaching a firing level, i.e., a magnitude at which said diode is ignited and caused to conduct. Should one or more light pulses fail to impinge on photoelectric tube 17, a corresponding number of electrical pulses will fail to be applied to the grid of tube 43. Thereupon, there will be sufficient time for condenser 54 to become charged to a value whereby gas diode 56 may ignite. This action, in turn, will cause a positive voltage to be applied to the grid of cathode follower tube 57 so as to cause the same to conduct, which, in turn, will cause 1.0 microfarad condenser 58 to charge through the cathode follower 57. This action will cause tube 59 to conduct and to remain conducting until after the effective charge on condenser 58 leaks off through relatively high impedance resistor 60. The duo-triodes 57 and 59 are preferably in a type 12AT7 vacuum tube. The values of condenser 58 and resistor 60 are such, e.g., 1.0 microfarad and 330,000 ohms, respectively, that at least one but probably as many as four complete revolutions of the scanning disc 14 occur before condenser 58 is discharged to the point where tube 59 will no longer conduct. During the time tube 59 conducts, a relay R1 is energized to operate circuits which indicate that the photogating scanning system has detected the presence of an object over the roadway 11 in the region between the light ray lines 23 and 24. The circuits controlled by relay R1 which corresponds to relay R451 in the afore-mentioned copending Cunningham et al. application, for indicating the presence of an object over the roadway may be those in photoelectric unit 19. It will be recalled that these latter circuits in conjunction with those of axle treadle 18 group the vehicle axles passing over the said treadle. Since the axle grouping feature per se is not a part of this invention, the same will not be described herein.

It has already been brought out that a light image of fluorescent lamp 10 is formed in slit-like aperture 13, and that the said image is scanned by the apparatus including disc 14. Inasmuch as it is necessary that the light intensity emitted from the fluorescent lamp be constant along the entire length of the lamp, D.C. operation of the lamp may be desirable since A.C. operation of a fluorescent lamp causes a light flicker. As mentioned previously, the operation of a fluorescent lamp on D.C. requires a certain running voltage, whereas a considerably greater voltage is required to ignite the same. To obtain this greater voltage via a D.C. power supply presents several practical problems which need not be covered herein because these problems have, in effect, been side-stepped by providing a unique arrangement for starting the fluorescent lamp 10 on A.C. and then automatically switching and operating the said lamp continuously on D.C.

The fluorescent lamp 10 is initially started on A.C. from a 115 volt source 64 in the usual manner for starting such lamps via the ballast 65 having a conventional lamp starter (not shown) therein for providing the high voltage necessary to start the fluorescent lamp. The starting circuit is from line 66 through ballast 65, contacts R10a n/c and 67 n/c, lamp 10, contacts 68 n/c, diode 69, relay R10, to line 70. Since contacts 67 and 68 are operated upon concurrently by cam 71, a similar circuit is possible through their respective normally open points. It should also be pointed out that fluorescent lamp 10 can be ignited during either half polarity portion of a sine wave. When line 70 is positive, the igniting circuit includes 2000 ohm resistor 72, whereas when line 66 is positive, the igniting circuit includes diode 69 and relay R10. It is important to notice that relay R10 will be energized only during a select half of the A.C. sine wave, i.e., during the period line 66 is positive, after lamp 10 is ignited. As soon as the lamp is ignited, the need for the high starting voltage is over so that the fluorescent lamp may then be switched over to the D.C. supply produced on lines 70 and 73 by transformer 74 and rectifying diodes 75 and 76. The D.C. supply is filtered by means of the filtering condenser 78. This switching is brought about by relay R10 which as has already been shown is connected in series circuit with fluorescent lamp 10 and diode 69. As stated previously, relay R10 will become energized only after the fluorescent lamp 10 is ignited, and due to diode 69, only during a select half polarity portion of the A.C. sine wave from source 64. As soon as relay R10 does become energized however, the contacts R10a are shifted to connect fluorescent lamp 10 and current limiting sixty watt tungsten filament lamp 77 across the rectified D.C. supply. Should the circuit to fluorescent lamp 10 open for any reason, relay R10 will drop out due to the open circuit so as to cause contacts R10a to connect the said lamp to the A.C. source once again. Contacts R10b are provided to selectively open and close the A.C. start circuit.

A common failing of a 72-inch fluorescent lamp when the same is operated on D.C., is a condition termed "light drifting" which is one wherein one end, i.e., either end, of the fluorescent lamp darkens and fails to emit light. With the advent of time, this no-light area increases so that after a period only a few inches at only one end of the 72-inch fluorescent lamp may be emitting light. That is, instead of having a 72-inch column of light, there may be only a 4-inch column of light, for example. A remedy for "light drifting" is simply the reversal of polarity of the D.C. being applied to the fluorescent lamp, which reversal in the preferred embodiment of this invention is effected in a unique manner by way of the contacts 67 and 68. These contacts are operated by a step cam 71 which, in turn, is operated in a step-by-step fashion by relay R2. It may be seen from the drawing that relay R2 is energized via contacts R1a whenever relay R1 is operated. Thus, each time that relay R1 is operated due to an object in the roadway 11, relay R2 is energized and cam 71 is advanced one step. Accordingly, the cam operated contacts 67 and 68 are shifted together to a new position to change the polarity of the D.C. voltage being applied to fluorescent lamp 10. This reversal is frequent enough during the course of normal operation of the toll recorder system that "light drifting" of the fluorescent lamp does not occur in the present system and, accordingly, is not a problem. It should be noted, however, that should "light drifting" occur for any reason, the scanning apparatus including disc 14 will detect this condition as an object over the roadway due to the absence of light wherever the fluorescent lamp has darkened. This condition would automatically cause the energization of relay R1 which, in turn, by means of relay R2 would cause the transfer of cam contacts 67 and 68 so as to switch the polarity of the D.C. potential to fluorescent lamp 10.

As has already been brought out, a column of light of uniform intensity is needed. It has been discovered that satisfactory results are obtainable through the use of a "warm white" type T-12 fluorescent lamp operated on A.C. and a type 931-A photomultiplier tube, if a yellow filter is used therebetween. Apparently the phosphor in the "warm white" lamp contains sufficient red spectrum producing elements of sufficiently long persistence that a relatively constant column of red light is available. Other colors, particularly blue, which are modulated at 120 cycles, are eliminated by the use of the yellow filter. Best results are obtained when a thermostatically governed heating element and fan are used to keep the temperature of the lamp at approximately 80° F.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An optical device having a source of light energy and light energy responsive means for detecting objects in a predetermined region between said light energy source and said light energy responsive means comprising optical means for operatively connecting said light energy source and said light energy responsive means by focusing an image of said light energy source in a focal plane therebetween, a mask arranged outside said focal plane having a transparent opening therein the configuration of which corresponds to the image of said light energy source, means for scanning said image at said focal plane so as to expose said light energy responsive means to successive portions of said image, and electrical means associated with said light energy responsive means for detecting an absence of light energy at said light energy responsive means during the scanning of said image, to thereby detect the presence of an object in said predetermined region.

2. An optical device having a source of light energy and light energy responsive means for detecting objects in a predetermined region between said light energy source and said light energy responsive means comprising optical means for operatively connecting said light energy source and said light energy responsive means by focusing an image of said light energy source in a focal plane therebetween, a mask arranged outside said focal plane having a transparent opening therein the configuration of which corresponds to the image of said light energy source, means for scanning said image at said focal plane so as to expose said light energy responsive means to successive portions of said image, an electrical object indicator, an electrical circuit operatively connected to said light responsive means for operating said object indicator in response to the detection of an absence of light energy at said light responsive means, and an electrical delay circuit for maintaining said object indicator operated for a time period greater than that required to completely scan said image.

3. A device for detecting movable and stationary objects over a roadway comprising an elongated source of light on one side of the roadway, a photoelectric tube including a suitable source of electrical power on the other side of the roadway, an optical system including a lens between said light source and said photoelectric tube for focusing an image of said light source in a focal plane between said light source and said tube, a mask arranged outside said focal plane having a transparent opening the configuration of which corresponds to the image of said light source, a continuously operating scanning apparatus for exposing said photoelectric tube at equally spaced periods to successive portions of said image at said focal plane, whereupon said photoelectric tube produces correspondingly equally spaced electrical signal pulses, and electronic means associated with said photoelectric tube for detecting the absence of one or more said electrical signal pulses, to thereby detect the presence of a light impeding object over the roadway.

4. A photogating scanning device for detecting movable and stationary objects over a roadway comprising a columnar source of light on one side of the roadway; a photoelectric tube including a suitable source of electrical power on the other side of the roadway; an optical system including at least a lens between said light source and said photoelectric tube for focusing an image of said light source in a focal plane between said light source and said tube; a mask arranged adjacent said focal plane having a transparent opening the configuration of which corresponds to the image of said light source; a continuously rotating scanning disc at said focal plane having radially and angularly equi-distant apertures moving in said focal plane for exposing said photoelectric tube at equally spaced periods determined by the angular spacings of said apertures to successive portions of said image determined by the radial spacings of said apertures, whereupon said photoelectric tube produces correspondingly equally spaced electrical signal pulses each of which is produced in response to the exposure of said photoelectric tube to each of said successive portions of said image; and electronic means associated with said photoelectric tube for detecting the absence of one or more said electrical signal pulses in said train of equally spaced signal pulses, to thereby detect the presence of an object over the roadway.

5. A device according to claim 4 wherein said electronic means includes an electrical object indicator, an electrical circuit for operating said object indicator in response to the detection of the absence of at least one of said electrical signal pulses, and an electrical delay circuit for maintaining said object indicator operated for a time period greater than that required for one revolution of said scanning disc.

6. A photogating scanning device according to claim 4 wherein said columnar source of light includes a fluorescent lamp, additionally comprising alternating current circuit means for igniting said lamp; direct current circuit means for operating said lamp after said lamp has been ignited; and electrical means for automatically switching said lamp from said alternating current circuit means to said direct current circuit means in response to the energization of said lamp, and from said direct current circuit means to said alternating current circuit means in response to the de-energization of said lamp, so as to selectively connect said lamp to only one of said circuit means.

7. In a device for detecting objects over a roadway comprising a columnar source of light on one side of the roadway; a photoelectric tube having an anode and a cathode on the other side of the roadway; an optical system including at least a lens between said light source and said photoelectric tube for focusing an image of said light source in a focal plane between said light source and said tube; a mask adjacent said focal plane having a transparent opening the configuration of which corresponds to the image of said light source; and a continuously rotating scanning disc at said focal plane having equi-distant apertures moving in said focal plane for exposing said photoelectric tube to successive portions of said image, whereupon said photoelectric tube produces a train of equally spaced electrical signal pulses each of which is produced in response to the exposure of said photoelectric tube to each of said successive portions of said image, the combination of a pair of resistors and a capacitor connected in series circuit; a diode rectifier connected at the high impedance end thereof to the anode of said photoelectric tube and at the other end thereof to the common junction of said pair of resistors; an electrical line for connecting the cathode of said photoelectric tube to a point common to one of said resistors and said capacitor, whereby said capacitor is electrically charged in response to each of said electrical signal pulses from said photoelectric tube which is more negative than the potential at said common junction of said resistors; and electronic means associated with said capacitor for detecting the absence of one or more electrical signal pulses, to thereby detect the presence of a light impeding object over the roadway.

8. An optical device for detecting and indicating movable and stationary objects over a roadway comprising a columnar source of light, lens means for focusing an image of said light source in a focal plane, a photoelectric tube, a scanning disc in said focal plane with angularly and radially spaced apertures for scanning successive areas of said image so as to expose said photoelectric tube to the areas of said image once for each rotation of said scanning disc, electrical means associated with said photoelectric tube for detecting the failure to expose said photoelectric tube to one or more areas of said image, and other electrical means governed by said detecting electrical means for indicating for a period of time in excess of that required for one rotation of said scanning disc the failure to expose said photoelectric tube to one or more areas of said image.

References Cited in the file of this patent

UNITED STATES PATENTS

| | | |
|---|---|---|
| 1,929,859 | Strauss | Oct. 10, 1933 |
| 2,089,835 | Logan | Aug. 10, 1937 |
| 2,104,600 | West | Jan. 4, 1938 |
| 2,113,899 | Oram | Apr. 12, 1938 |
| 2,171,362 | Gulliksen | Aug. 29, 1939 |
| 2,227,037 | Schlesinger | Dec. 31, 1940 |
| 2,293,521 | Thom | Aug. 18, 1942 |
| 2,432,123 | Potter | Dec. 9, 1947 |
| 2,473,893 | Lyle | June 21, 1949 |
| 2,481,310 | Hutchinson et al. | Sept. 6, 1949 |
| 2,516,179 | Bradley | July 25, 1950 |
| 2,538,536 | Ritchie et al. | Jan. 16, 1951 |
| 2,549,179 | Delamare-Deboutteville | Apr. 17, 1951 |
| 2,593,952 | Willoughby | Apr. 22, 1952 |
| 2,632,040 | Rabinow | Mar. 17, 1953 |
| 2,813,230 | Fruengel | Nov. 12, 1957 |